United States Patent [19]
Fukui

[11] 4,174,763
[45] Nov. 20, 1979

[54] DRIVE CONTROLLING MECHANISM
[75] Inventor: Kiyozumi Fukui, Gifu, Japan
[73] Assignee: Teijin Seiki Company Limited, Osaka, Japan
[21] Appl. No.: 903,044
[22] Filed: May 5, 1978

Related U.S. Application Data
[63] Continuation-in-part of Ser. No. 750,537, Dec. 14, 1976, Pat. No. 4,114,737.

[30] Foreign Application Priority Data
Dec. 18, 1975 [JP] Japan .......................... 50-171224[U]

[51] Int. Cl.$^2$ ........................................... B62D 11/08
[52] U.S. Cl. ................................. 180/6.48; 180/9.62; 180/308
[58] Field of Search .................. 180/6.48, 9.62, 70 R, 180/66 F; 192/3 N

[56] References Cited
U.S. PATENT DOCUMENTS
3,800,901  4/1974  Blomstrom ........................ 180/9.62
3,990,528  11/1976  Haak .............................. 180/9.62

Primary Examiner—Joseph F. Peters, Jr.
Assistant Examiner—John A. Carroll
Attorney, Agent, or Firm—Cushman, Darby & Cushman

[57] ABSTRACT

A crawler type travelling vehicle comprises in combination: an endless belt including a number of segments flexibly connected with each other to crawl on the earth; a sprocket wheel drivably engageable with the endless belt and having an axial wheel bore extending axially thereof; a motor housing inserted in said axial wheel bore to rotatably support the sprocket wheel through two bearings with the mid-circumferential plane of the sprocket wheel positioned between the mid-circumferential planes of the bearings; a fixed frame positioned axially inwardly of the sprocket wheel to securely support the motor housing and having an axial frame bore in axial alignment with the axial wheel bore; a hydraulic motor accommodated in the motor housing and having a rotary shaft; a reduction gear unit positioned axially outwardly of the sprocket wheel and within the width of the endless belt to operably be connected with one end portion of the rotary shaft in driving engagement with the sprocket wheel; a control block disposed within the width of the endless belt and securely connected with the axially inner face of the motor housing to rotatably receive the other end portion of the rotary shaft; and a pair of inlet-outlet passages in fluid communication with the hydraulic motor to allow fluid under pressure to pass therein for imparting rotation of the hydraulic motor.

20 Claims, 8 Drawing Figures

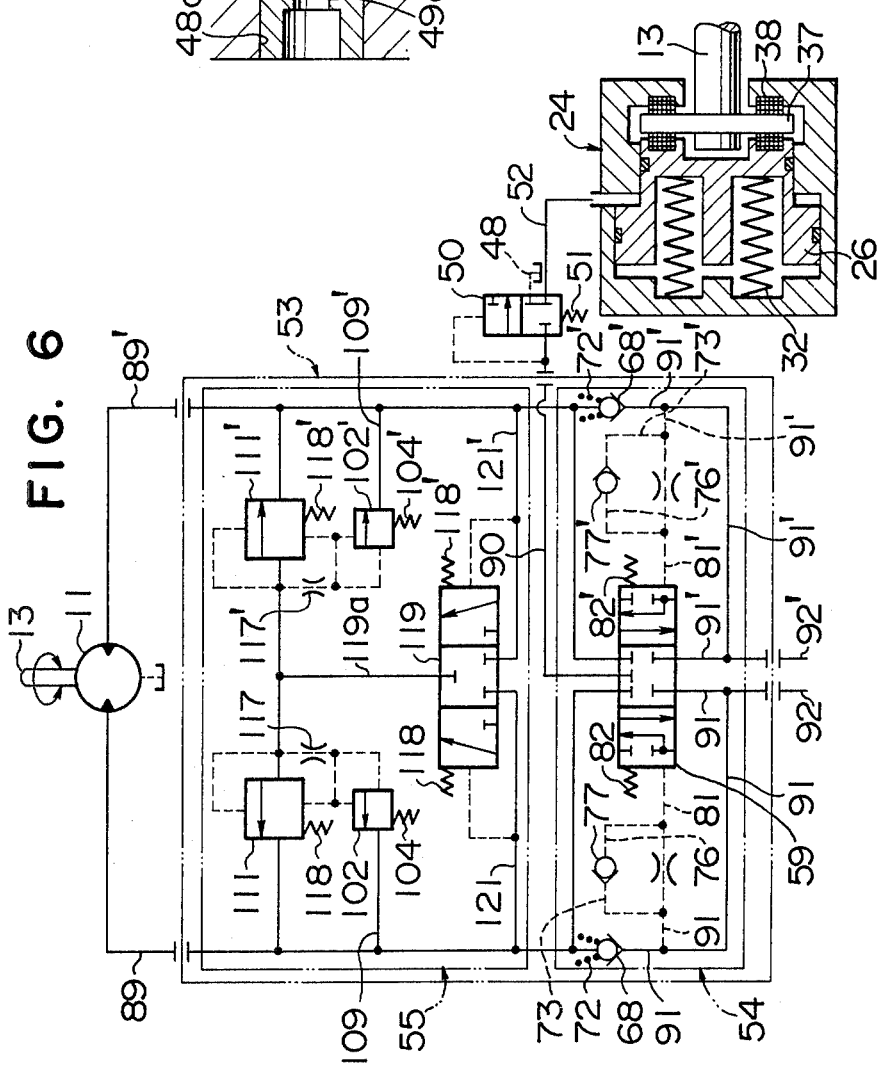

DRIVE CONTROLLING MECHANISM

This application is a continuation-in-part of application, Ser. No. 750,537, filed Dec. 14, 1976, now U.S. Pat. No. 4,114,737.

This invention relates to a crawler type travelling vehicle as bulldozer, shovel loader and the like and, in particular, to a crawler type travelling vehicle comprising an endless belt and a drive mechanism for driving the endless belt, wherein the drive mechanism is made compact and arranged with the width of the endless belt.

There have been proposed a variety of such vehicles each of which comprises an endless belt, a sprocket wheel in driving engagement with the endless belt, and a drive means such as a hydraulic motor, a reduction gear unit for transmitting a rotational torque of the hydraulic motor to the sprocket wheel in an increased level, a control block housing means for controlling rotation of the hydraulic motor and so on any one or two of which were located to project over the width of the endless belt. This resulted in damages thereto when they collided with hard obstacles upon running of the vehicle.

It is therefore an object of the present invention to provide a crawler type travelling vehicle which overcomes the previously mentioned drawbacks by arranging all the mechanical parts within the endless belt.

It is another object of the present invention to provide a crawler type travelling vehicle which has bearings for rotatably engaging the sprocket wheel and a motor housing accommodating therein the hydraulic motor, the bearings being adapted to equally receive loads exerted thereon and thereby to be minimized in size.

The above objects are attained by a crawler type travelling vehicle of the present invention comprising in combination; an endless belt including a number of segments flexibly connected with each other to crawl on the earth; a sprocket wheel drivably engageable with the endless belt and having an axial wheel bore extending axially thereof; a motor housing inserted in the axial wheel bore to rotatably support said sprocket wheel through two bearings with the mid-circumferential plane of the sprocket wheel positioned between the mid-circumferential planes of the bearings; a fixed frame positioned axially inwardly of the sprocket wheel to securely support the motor housing and having an axial frame bore in axial alignment with the axial wheel bore; a hydraulic motor accommodated in the motor housing and having a rotary shaft; a reduction gear unit positioned axially outwardly of the sprocket wheel and within the width of the endless belt to operably be connected with one end portion of the rotary shaft in driving engagement with sprocket wheel; a control block disposed within the width of the endless belt and securely connected with the axially inner face of the motor housing to rotatably receive the other end portion of the rotary shaft; and a pair of inlet-outlet passages in fluid communication with the hydraulic motor to allow fluid under pressure to pass therein for imparting rotation of the hydraulic motor.

The above and other objects features and advantages of the present invention will become clear from the following particular description of the invention and the appended claims, taken in conjunction with the accompanying drawings which show by way of example a preferred embodiment of the present invention.

In the accompanying drawings:

FIG. 6 is an oil circuit showing circulation of a pressure oil in a drive controlling mechanism of the crawler type travelling vehicle;

FIG. 7 is an enlarged cross-sectional view of parts around a shuttle valve as shown in FIG. 3.

For the convenience of describing the specification and defining the appended claims, the terms "axially inner" and "axially inward" are intended to mean "near side" of the central plane equally spaced apart from endless belts provided in a crawler type travelling vehicle according to the present invention. By the same reason, the terms "axially outer" and "axially outward" are intended to means "remote side" of the central plane just mentioned.

Figure 1:
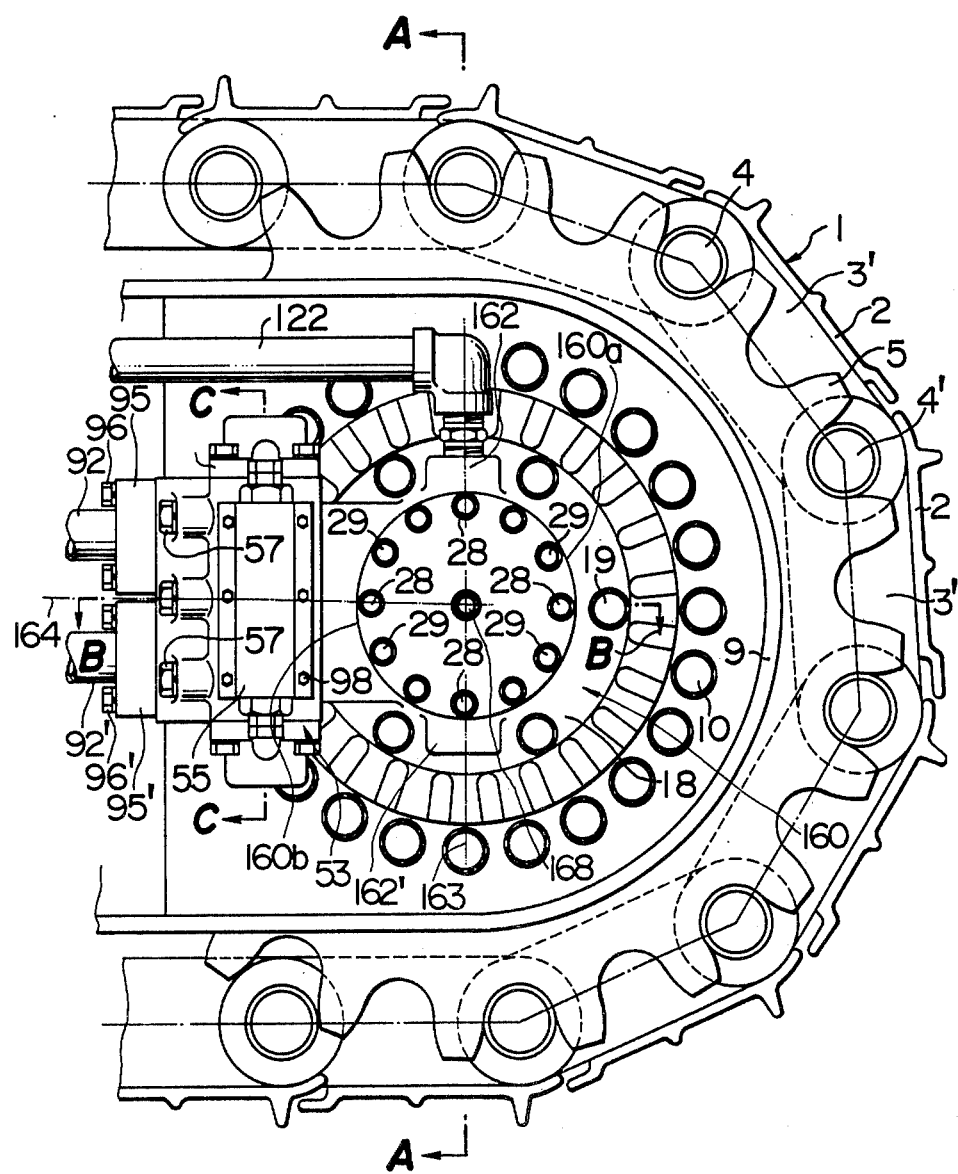
FIG. 1 is a side view of a crawler type travelling vehicle embodying the present invention.
Figure 2:
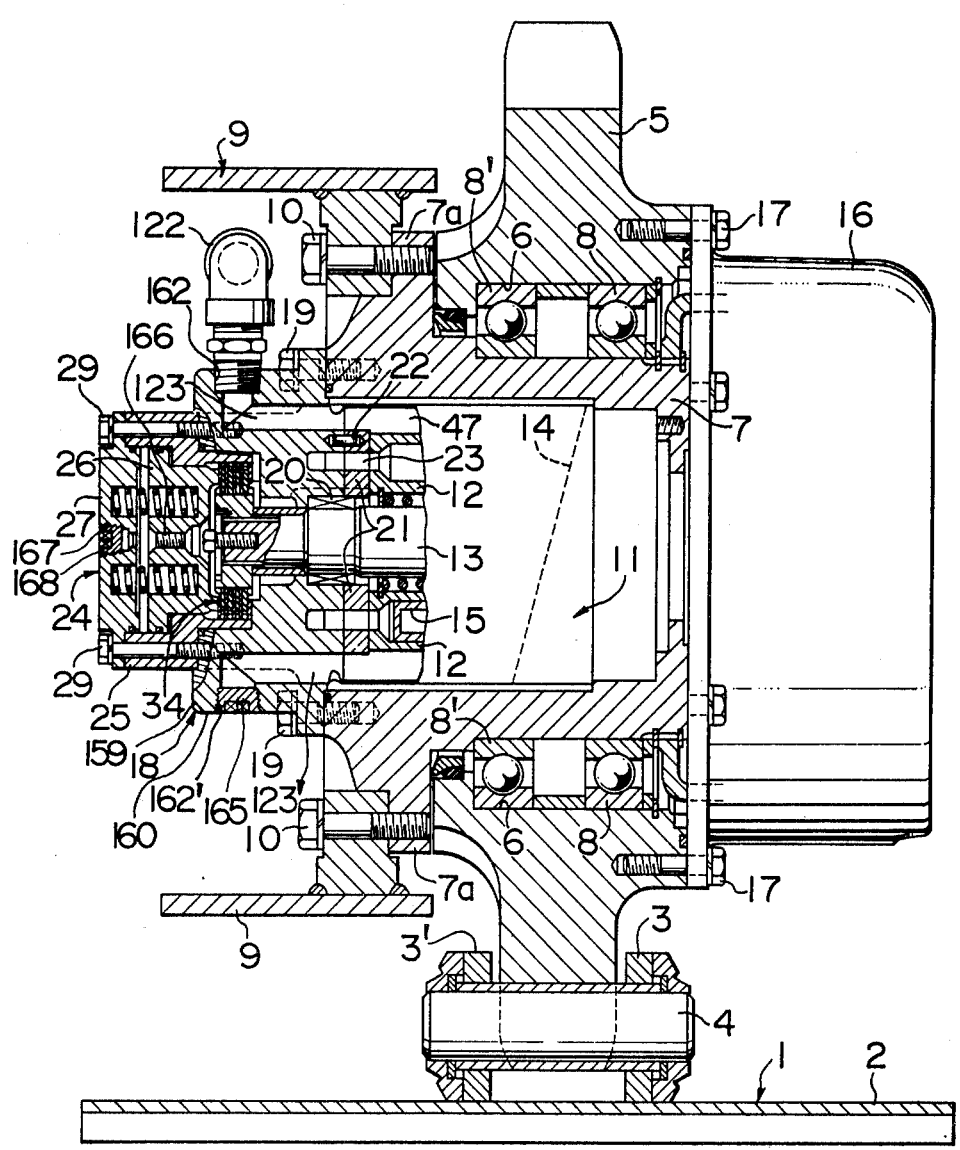
FIG. 2 is a cross-sectional view as seen from the lines A—A indicated in FIG. 1.
Figure 3:
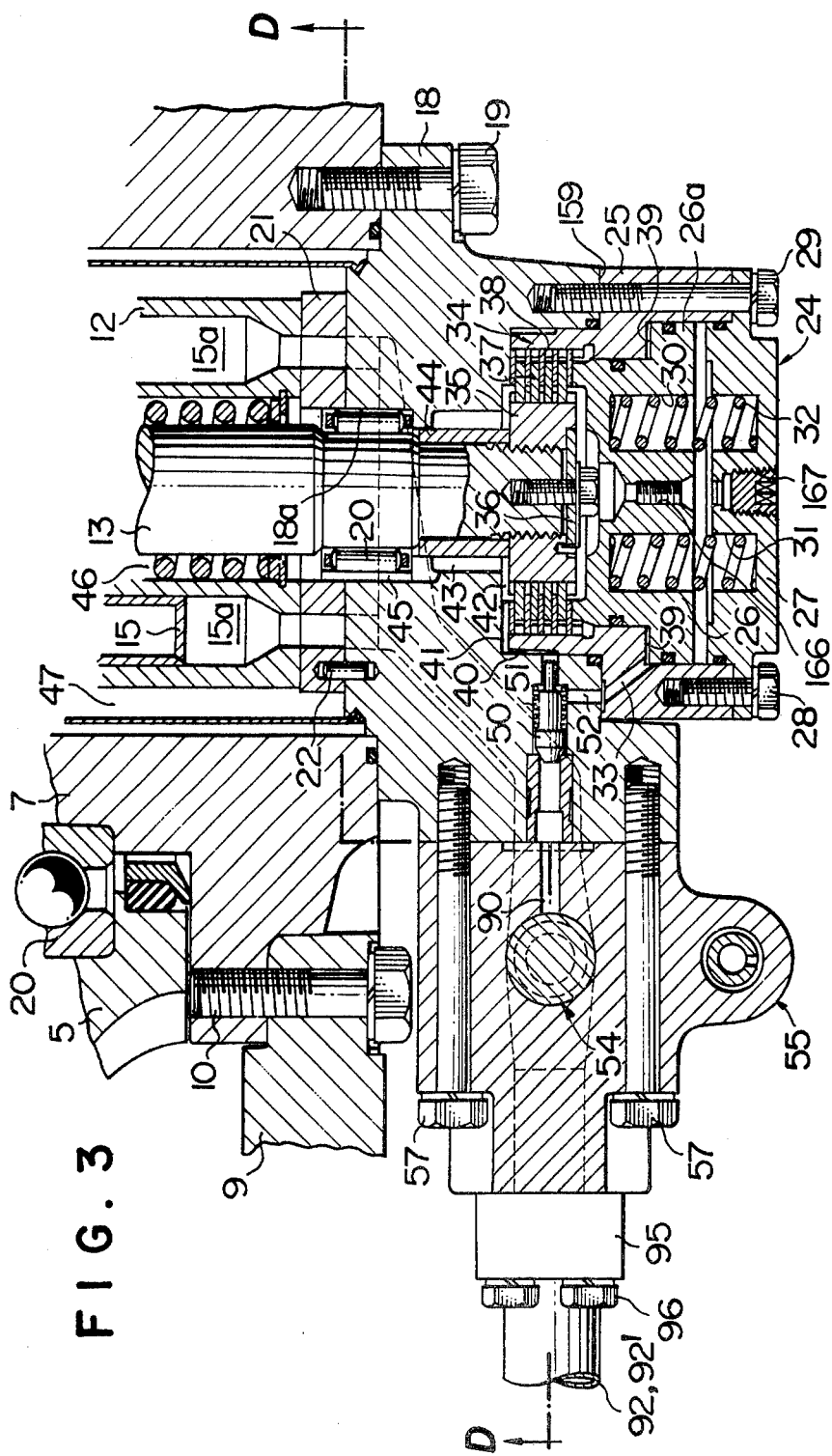
FIG. 3 is a cross-sectional view as seen from the lines B—B indicated in FIG. 1.
Figure 8:
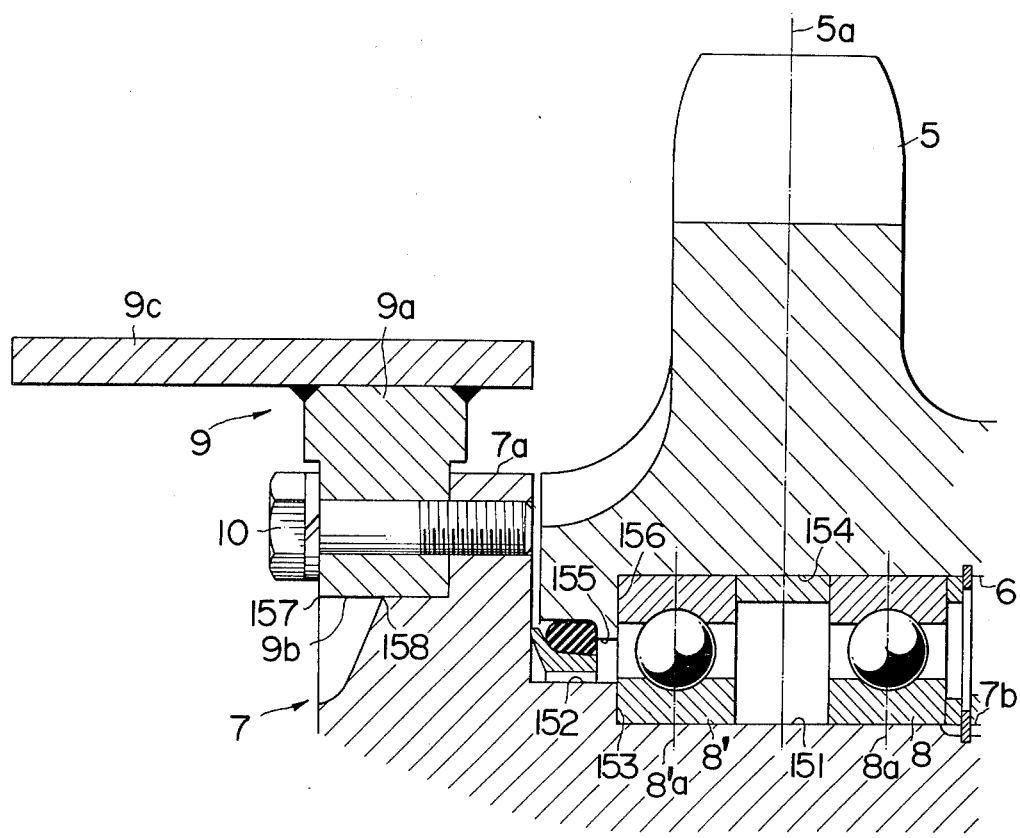
FIG. 8 is an enlarged view around bearings which rotatably engaging a sprocket wheel and a motor housing accommodating therein a hydraulic motor for driving the travelling vehicle.

Referring now to the drawings and particularly to FIGS. 1, 2 and 3, there is shown an endless belt, generally indicated at 1, which comprises a number of segments 2 each having at its inner wall a pair of spaced parallel legs 3 and 3'. A pair of pins 4 and 4' are rotatably carried on the legs 3 and 3' in spaced and parallel relation with each other along the travelling direction of the segments 2 and each pin connects two adjacent segments 2 to constitute the endless belt 1 as a whole so that the segments 2 are flexibly connected to crawl on the earth. A sprocket wheel 5 is engageable with the pins 4 and 4' to drive the endless belt 1 through the legs 3 and 3', and has an axial wheel bore 6. A fixed frame generally represented at 9 is best shown in FIG. 8 to comprise a disc portion 9a having an axial frame bore 9b in axial alignment with the axial wheel bore 6 of the sprocket wheel 5 and a covering portion 9c having an inner peripheral face securely connected with the radially outer face of the disc portion 9a and extending axially inwardly of the sprocket wheel 5. A motor housing generally denoted at 7 comprises a flange portion 7a detachably connected with the disc portion 9a of the fixed frame 9 by means of bolts 10 and a cylindrical portion 7b inserted in the axial wheel bore 6 of the sprocket wheel 5. The cylindrical portion 7b has a first peripheral face 151 and a second peripheral face 152 positioned axially inwardly of and connected with the first peripheral face 151 through an annular ledge 153, the first peripheral face 151 being smaller in diameter than the second peripheral face 152. The second peripheral face 152 is smaller in diameter than the frame bore 9b. The axial wheel bore 6 has a first peripheral face 154 in opposing relation with the first peripheral face 151 of the cylindrical portion 7b, and a second peripheral face 155 connected with the first peripheral face 154 through an annular ledge 156, the first peripheral face 154 of the axial wheel bore 6 being larger in diameter than the second peripheral face 155 of the axial wheel bore 6. Two bearings 8 and 8' are disposed between the first periperal face 151 of the motor housing 7 and the first peripheral face 154 of the axial wheel bore 6 with the mid-circumferential plane 5a of the sprocket wheel 5 positioned between the mid-circumferential planes 8a and 8a' of the bearings 8 and 8' so that the motor housing 7 rotatably supports the sprocket wheel 5 through the bearings 8 and 8'. It is most preferable that the mid-circumferential plane 5a of the sprocket wheel 5 is equally spaced apart from the midcircumferential planes 8a and 8a' of the bearings 8 and 8'. A circumferential line 157 at the axially innermost end of the axial frame bore 9b of the disc portion 9a is projected or located axially inwardly of a circumferential line 158 at the axially innermost end of the flange portion 7a of the motor housing 7 in contact with the axial frame bore 9b of the disc portion 9a.

Turning to FIGS. 1, 2 and 3, the motor housing 7 is adapted to accommodate therein a hydraulic motor, generally indicated at 11, which includes cylinder block 12, and a rotary shaft 13 extending axially of and positioned within the cylinder block 12 to be splinedly engaged with the cylinder block 12 for rotation therewith. An inclined plate 14 is accommodated within the hydraulic motor 11 to be engaged with a plurality of pistons 15 slidably received in the cylinder block 12. On the axially outward face of the sprocket wheel 5 is securely mounted a reduction gear unit 16, by means of bolts 17, which is disposed within the width of the endless belt 1 in driving connection with one end portion of the rotary shaft 13 so that the sprocket wheel 5 can be rotated through the reduction gear unit 16 by the rotary shaft 13 when the hydraulic motor 11 is driven by a pressure oil. A control block, generally indicated at 18, is disposed within the width of the endless belt 1 and is securely connected with the axially inner end face of the flange portion 7a of the motor housing 7 by means of bolts 19 to close the axially inner end of the motor housing 7. The control block 18 has an axial bore 18a to rotatably receive the other end portion of the rotary shaft 13 through bearing 20. Between the axially inward face of the cylinder block 12 and the axially outward face of the control block 18 is interposed a timing plate 21 which is coupled with the control block 18 by pins 22 and which has two arcuate bores or actuation ports 23 circumferentially aligned and equidistantly spaced apart from each other to be communicatable with a plurality of cylinder bores 15a each slidably receiving the piston 15. The control block 18 has an axially inner end face 159 and an outer peripheral face 160 having an axially inner end connected to the axially inner end face 159. The outer peripheral face 160 of the control block 18 comprises a first angular face portion 160a corresponding to the endless belt 1 and the sprocket wheel 5 engaged with each other and a second angular face portion 160b corresponding to the endless belt 1 and the sprocket wheel 5 disengaged from each other. A parking brake arrangement, generally represented at 24, is best shown in FIG. 3 comprise a cylindrical receiving member 25 attached to the axially inner end face 159 of the control block 18 to allow the other end portion of the rotary shaft 13 to be projected therein in axial alignment therewith, a covering member 27 attached to the axially inner face of the receiving member 25 to define a hydraulic chamber 39 together with the receiving member 25 and the control block 18, and a movable member 26 provided in the hydraulic chamber 39 to be movable toward and away from the other end portion of the rotary shaft 13 and having at its axially inner end a piston portion 26a. The receiving member 25 may be integrally formed with the control block 18. The receiving member 25 and the covering member 27 are detachably connected to each other by four bolts 28 and are also detachably connected to the control block 18 by a number of bolts 29. The movable member 26 is formed with a plurality of recesses 30 axially extending from the axially inner end face of the movable member 26, while the covering member 27 is also formed with a plurality of recesses 31 axially extending and opposing to the recesses 30. A plurality of compression coil springs 32 are accommodated in the recesses 30 and 31 for urging the movable member 26 toward the hydraulic motor 11. In the receiving member 25 is formed a conduit 33 having one end opened at a position axially outwardly of the piston portion 26a of the movable member 26 and the other end in communication with another conduit which will become apparent as the explanation proceeds. A brake device generally designated at 34 comprises a cylindrical member 35 securely mounted on the other end portion of the rotary shaft 13 by means of a locking means 36, a plurality of annular inner discs 37 each having an inner peripheral face splined to the outer peripheral wall of the cylindrical member 35, and a plurality of annular outer discs 38 each of which is interposed between the annular inner discs 37 and each of which has an outer peripheral face splined to the inner peripheral wall of the receiving member 25. The axially innermost disc 37 is adapted to be engageable with the axially outer end of the movable member 26. The annular inner and outer discs 37 and 38 are thus engaged with each other to brake the rotary shaft 13 through the cylindrical member 35 when the pressure oil within the hydraulic chamber 39 axially outwardly of the piston portion 26a is discharged through the conduit 33 to axially outwardly move the movable member 26 by the action of the compression coil springs 32. When the pressure oil is, on the other hand, introduced into the chamber 39 through the conduit 33 to urge the piston portion 26a against the compression coil spring 32, the movable member 26 is moved axially outwardly so that the annular inner and outer discs 37 and 38 are disengaged from each other to enable the rotary shaft 13 to be freely rotatable. A groove 40 is formed on the outer peripheral wall of the receiving member 25 while another groove 41 is formed on the axially inner end of the receiving member 25 to be in communication with the groove 40. Axially outwardly of the cylindrical member 35 is formed a gap 42 which is in communication with the groove 41 and an annular groove 43 is provided radially outwardly of a metal sleeve 44 which is interposed between the bearing 20 and the cylindrical member 35 to surround the rotary shaft 13. An axial groove 45 is formed radially outwardly of the bearing 20 and on the peripheral wall of the axial through bore 18a to axially extend in communication with the annular groove 43 and an annular chamber 46 defined by the cylinder block 12 and the rotary shaft 13. Between the motor housing 7 and the cylinder block 12 is provided an annular drain chamber 47 which is communicated with the annular chamber 46 through clearances formed by various mechanical components of elements of the hydraulic motor 11. A drain passage arrangement as defined in appended claims is constituted as a whole by the groove 40, groove 41, the gap 42, the annular groove 43, the axial groove 45, the annular chamber 46 and the clearances formed by various mechanical components of the hydraulic motor 11.

As best shown in FIG. 7, a radial bore 48 is formed in the control block 18 to have a radially inner end opened at the groove 40 and a radially outer end opened at the outer peripheral wall of the control block 18. The radial bore 48 comprises a large diameter portion 48a at a position remote from the rotary shaft 13, i.e., adjacent to a control valve arrangement as will be described hereinafter, to fittedly receive a bush 49 having a bore 49a, a small diameter portion 48b at a position adjacent to the rotary shaft 13, i.e., adjacent to the groove 40 of the drain passage arrangement, and an intermediate diameter portion 48c having radially outer and inner ends respectively connected with the large diameter portion 48a and the small diameter portion 48b, respectively. A shuttle valve 50 comprises a tapered head 50a disposed in the intermediate diameter portion 48c of the radial bore 48 to be engageable with the radially inner end of the bush 49, a large diameter stem 50b having a radially outer end integrally formed with the tapered head 50a to be disposed in the intermediate diameter portion 48c of the radial bore 48 and a small diameter stem 50c having a radially outer end integrally formed with the large diameter stem 50b and loosely fitted in the small diameter portion 48b of the radial bore 48 so as to permit the pressure oil to be passed through an annular gap formed between the small diameter portion 48b and the small diameter stem 50c. A compression coil spring 51 is accommodated in the intermediate diameter portion 48c of the radial bore 48 to surround the large diameter stem 50b so that the shuttle valve 50 is radially outwardly urged to make the tapered head 50a to be engaged with the radially inner end of the bush 49, thereby closing the bore 49a. A conduit 52 is formed in the control block 18 to have one end communicated with the conduit 33 formed in the receiving member 25 and the other end opened at the intermediate diameter portion 48c of the radial bore 48 so that the pressure oil is introduced into the hydraulic chamber 39 and discharged from the hydraulic chamber 39 through the conduit 33. A first control conduit as defined in appended claims is intended to indicate the radial bore 48, and a second control conduit defined in appended claims is also intended to indicate the conduit 33 formed in the receiving member 25 and the conduit 52 formed in the control block 18.

Figure 4:
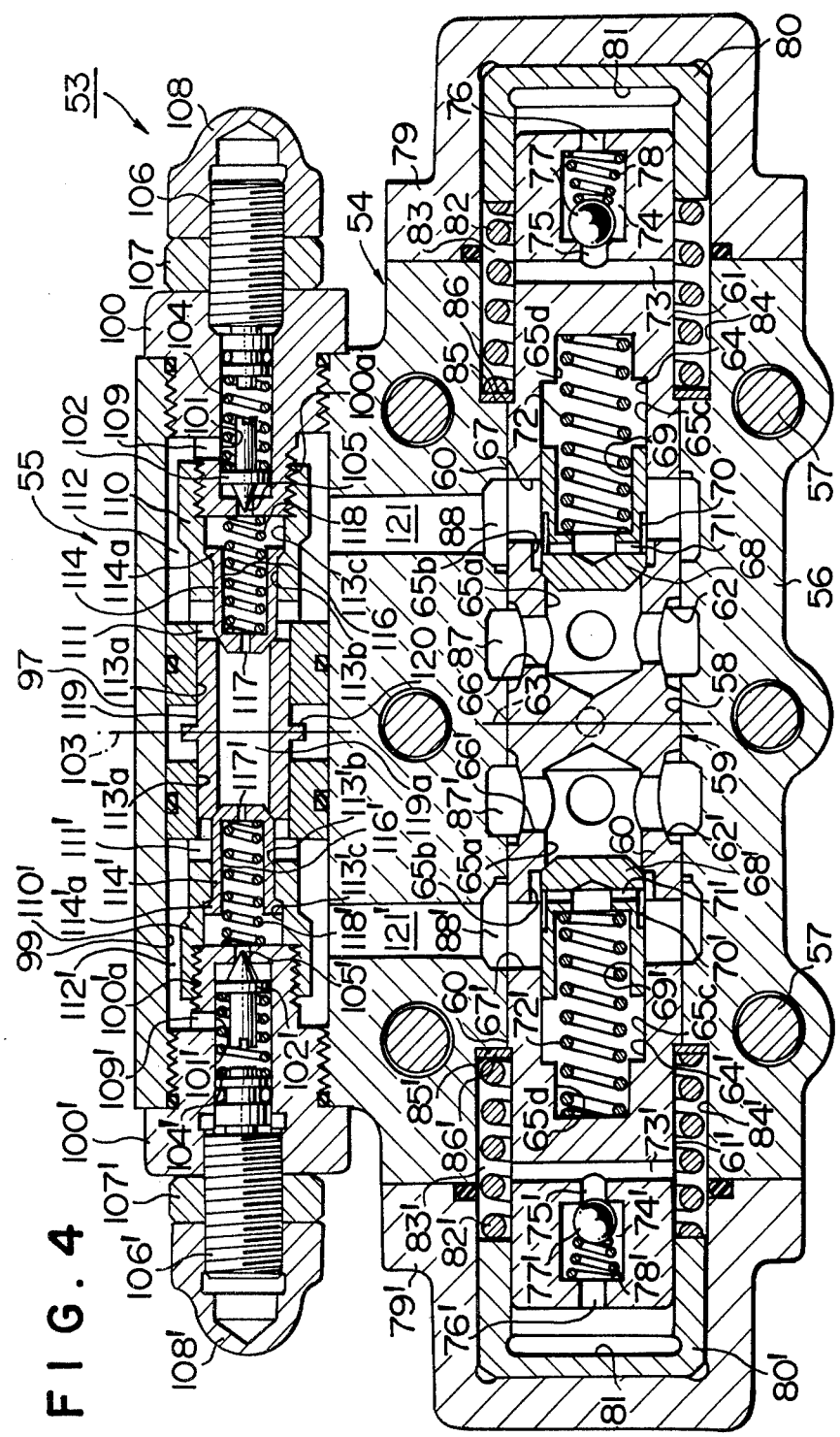
FIG. 4 is an enlarged cross-sectional view as seen from the lines C—C indicated in FIG. 1.
Figure 5:
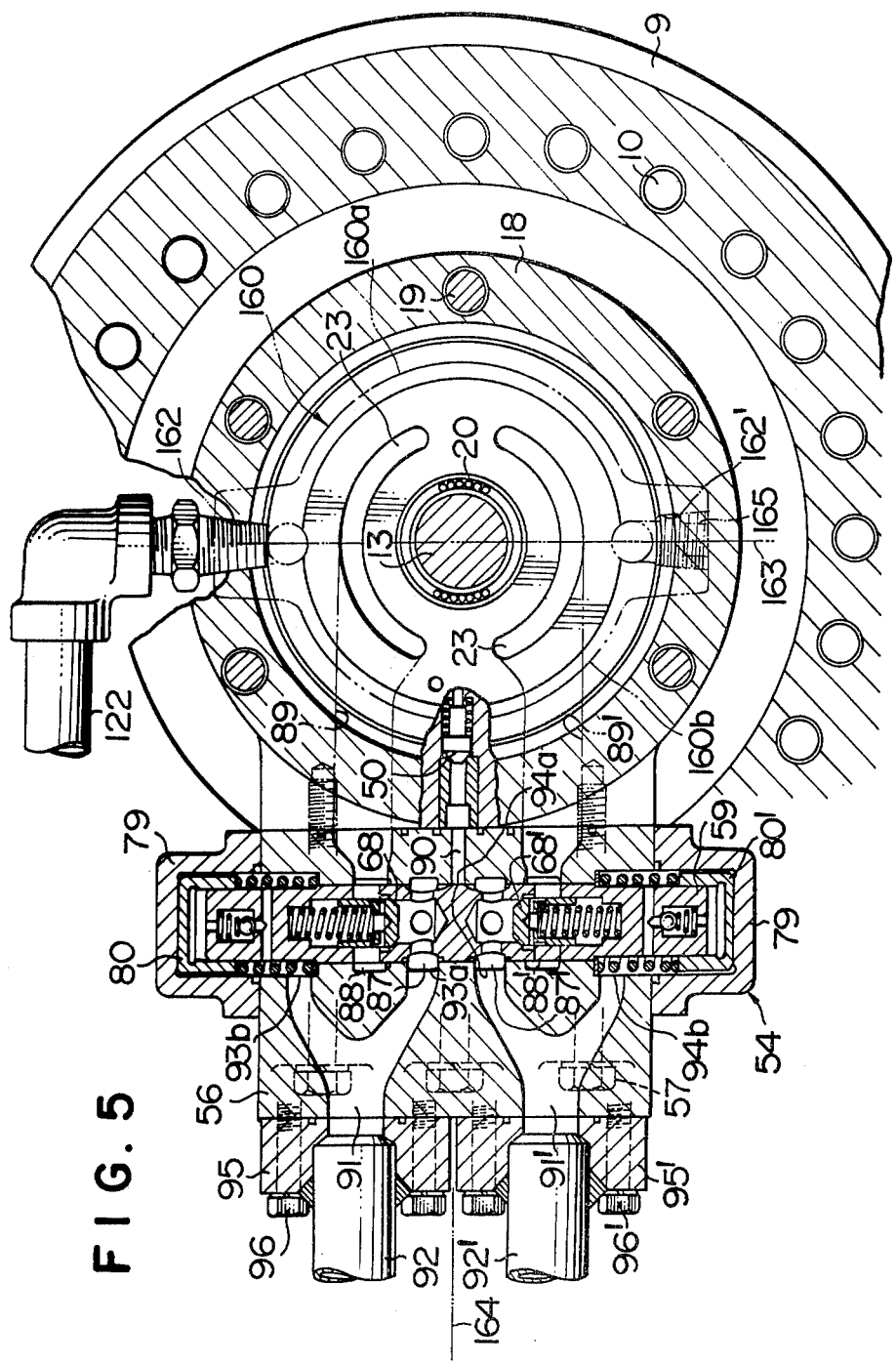
FIG. 5 is a cross-sectional view as seen from the lines D—D indicated in FIG. 3.

As shown in FIGS. 4 and 5, a control valve arrangement generally indicated at 53 comprises a first changeover valve generally designated at 54 for stopping introduction and discharge of the pressure oil to and from the hydraulic motor 11 as well as to and from the hydraulic chamber 39 for actuating the parking brake arrangement 24, and a second change-over valve, generally designated at 55, communicated with the first changeover valve 54 for circulating the pressure oil within the hydraulic motor 11 upon stoppage of introduction of the pressure oil into the hydraulic motor 11. A valve block 56 is detachably mounted on the second angular face portion 160b of the outer peripheral face of the control block 18 by means of bolts 57 and is formed with a valve bore 58 which is located to extend within a plane substantially perpendicular to the axis rotary shaft 13. A valve spool generally indicated at 59 is slidably received in the valve bore 58 to extend within a plane substantially perpendicular to the axis of the rotary shaft 13 and comprises a large diameter portion 60 and a small diameter portion 61 and 61' at the both sides of the large diameter portion 60. A pair of annular grooves 62 and 62' are formed on the outer peripheral wall of the valve spool 59 in symmetrical relation with respect to an equatorial plane 63 of the valve spool 59. A pair of axial bores 64 and 64' are symmetrically formed in the valve spool 59 with respect to the equatorial plane 63 of the valve spool 59. Each of the axial bores 64 and 64' comprises a first diameter portion 65a, a second diameter portion 65b having a diameter larger than the first diameter portion 65a, a third diameter portion 65c having a diameter somewhat larger than that of the first diameter portion 65a, and a fourth diameter portion 65d having a diameter smaller than that of the first diameter portion 65a, which are arranged in this order in a direction outwardly of the equatorial plane 63 of the valve spool 59. The first diameter portion 65a of the axial bore 64 is communicated with the annular groove 62 through a plurality of first radial bores 66, while the first diameter portion 65a of the axial bore 64' is also communicated with the annular groove 62' through a plurality of first radial bores 66'. The second diameter portion 65b of the axial bore 64 is communicated with the outer peripheral wall of the large diameter portion 60 of the valve spool 59 through a plurality of second radial bores 67, while the second diameter portion 65b of the axial bore 64' is communicated with the outer peripheral wall of the large diameter portion 60 of the valve spool 59 through a purality of second radial bores 67', the second radial bores 67 and 67' being symmetrically arranged with respect to the equatorial plane 63 of the valve spool 59. A pair of check valves 68 and 68' are slidably received in the axial bores 64 and 64', respectively. The check valve 68 is formed with a recess 69 opened at a side remote from the equatorial plane 63 of the valve spool 59 and has an outer peripheral wall formed with an annular groove 70 which is in communication with the recess 69 through a plurality of radial bores 71. On the other hand, the check valve 68' is also formed with a recess 69' opened at a side remote from the equatorial plane 63 of the valve spool 59 and has an outer peripheral wall formed with an annular groove 70' which is in communication with the recess 60' through a plurality of radial bores 71'. A compression coil spring 72 is housed in the axial bore 64 to have one end engaged with the bottom of the fourth diameter portion 65d of the axial bore 64 and the other end engaged with the bottom of the recess 69 so that the check valve 68 is urged toward the equatorial plane 63 of the valve spool 59, while another compression coil spring 72' is housed in the axial bore 64' to have one end engaged with the bottom of the fourth diameter portion 65d of the axial bore 64' and the other end engaged with the bottom of the recess 69' so that the check valve 68' is urged toward the equatorial plane 63 of the valve spool 59. A pair of radial passages 73 and 73' are formed radially in the valve spool 59 axially outwardly of the axial bores 64 and 64', respectively, in symmetrical relation with the equatorial plane 63 of the valve spool 59 to extend throughout the valve spool 59 and to be opened at the peripheral face of the valve spool 59. A pair of chambers 74 and 74' are formed axially in the valve spool 59 axially outwardly of the radial passages 73 and 73', respectively, in symmetrical relation with the equatorial plane 63 of the valve spool 59. The chamber 74 is communicated with the radial passage 73 through an axial bore 75 and opened at the axially outer end of the valve spool 59 through another axial bore 76, while the chamber 74' is communicated with the radial passage 73' through an axial bore 75' and opened at the axially outer end of the valve spool 59 through another axial bore 76'. A spherical valve 77 is retained in the chamber 74 to be urged toward the equatorial plane 63 of the valve spool 59 by a conical compression coil spring 78 which is similarly accommodated in the chamber 74, while a spherical valve 77' is also retained in the chamber 74' to be urged toward the equatorial plane 63 of the valve spool 59 by a conical compression coil spring 78' which is similarly accommodated in the chamber 74', with the result that the spherical valves 77 and 77' at all times close the axial bores 75 and 75', respectively. A pair of valve covers 79 and 79' are bolted to the valve block 56 to cover the axially outer end portions of the valve spool 59 and loosely receive dumper valves 80 and 80', respectively. Each of the dumper valves 80 and 80' is formed with a recess 81 which is adapted to loosely receive the axially outer end portion of the valve spool 59. A pair of compression coil springs 82 and 82' are respectively housed in annular chambers 83 and 83', respectively, defined by the small diameter portions 61 and 61' of the valve spool 59 and recesses 84 and 84' formed at the sides of the valve block 56 to urge annular ledges 85 and 85' formed between the small diameter portions 61, 61' and the large diameter portion 60 and the bottom of the recesses 84 and 84' through annular rings 86 and 86'. A pair of first annular grooves 87 and 87' are symmetrically formed on the inner peripheral wall of the valve bore 58 with respect to the equatorial plane 63 of the valve spool 59 to be in communication with the annular grooves 62 and 62', respectively. On the inner peripheral wall of the valve bore 58 axially outwardly of the first annular grooves 87 and 87' with respect to the equatorial plane 63 of the valve spool 59 are formed a pair of second annular grooves 88 and 88' which are communicated with the second radial bores 67 and 67', respectively. A first conduit 89 is formed in the valve block 56 and the control block 18 to have one end communicated with the second annular groove 88 and the other end communicated with arcuate bore 23 of the timing plate 21, while another first conduit 89' is also formed in the valve block 56 and the control block 18 to have one end communicated with the second annular groove 88' and the other end communicated with arcuate bore 23 of the timing plate 21. A central radial bore 90 is formed in the valve block 56 to have one end communicated with the bore 49a of the bush 49 and the other end opened at the central point of the valve bore 58 but closed by the outer peripheral wall of the valve spool 59 in a state shown in FIG. 5. A pair of second conduits 91 and 91' are formed in the valve block 56 to have one ends connected with pipes 92 and 92', respectively. The second conduit 91 is bifurcated at the other end to have branched openings 93a and 93b the former of which is communicated with the first annular groove 87 and the latter of which is communicated with the recess 84, while the second conduit 91' is also bifurcated at the other end to have branched openings 94a and 94b the former of which is communicated with the first annular groove 87' and the latter of which is communicated with the recess 84'. An inlet-outlet passage as defined in appended claims is constituted as a whole by the first conduit 89, the second conduit 91 and the pipe 92, while another inlet-outlet passage as defined in appended claims is also constituted as a whole by the first conduit 89', the second conduit 91' and the pipe 92'. A pair of couplings 95 and 95' are attached to the valve block 56 by means of bolts 96 and 96', respectively, for the purpose of reinforcing the pipes 92 and 92'. A valve casing 97 is securely mounted on the side of the valve block 56 by means of bolts 98 (see FIG. 1) to have therein an axial bore 99 extending in parallel to the valve bore 58 of the valve block 56. A pair of plugs 100 and 100' are threadedly attached to the both ends of the valve casing 97 to close the axial bore 99. The plug 100 is formed with a recess 101 opened axially outwardly and receiving a pilot valve 102 which is urged toward an equatorial plane 103 of the valve casing 97 by a compression coil spring 104 housed in the recess 101. The recess 101 is opened at its bottom through a bore 105, which is normally closed by the pilot valve 102, but closed by an adjusting screw 106 which is threadedly engaged with the axially outer end of the plug 100 for adjusting a spring force of the compression coil spring 104. Two lock nuts 107 and 108 are threaded to the adjusting screw 106 for fastening the adjusting screw 106 to the plug 100. The plug 100 has a small diameter fore end portion 100a which is formed with a radial bore 109 communicated with the recess 101 and opened at the outer peripheral wall of the small diameter portion 100a. On the other hand, the plug 100' is formed with a recess 101' opened axially outwardly and receiving a pilot valve 102' which is urged toward the equatorial plane 103 of the valve casing 97 by a compression coil spring 104' housed in the recess 101'. The recess 101' is opened at its bottom through a bore 105', which is normally closed by the pilot valve 102', but closed by an adjusting screw 106' which is threadedly engaged with the axially outer end of the plug 100' for adjusting a spring force of the compression coil spring 104'. Two lock nuts 107' and 108' are threaded to the adjusting screw 106' for fastening the adjusting screw 106' to the plug 100'. The plug 100' has a small diameter fore end portion 100a' which is formed with a radial bore 109' communicated with the recess 101' and opened at the outer peripheral wall of the small diameter portion 100a'. A cylindrical guide 110 is housed in the valve casing 97 in such a manner that the axially outer end of the cylindrical guide 110 remote from the equatorial plane 103 is threaded to the small diameter portion 100a of the axially inner end of the plug 100 adjacent to the equatorial plane 103 is slidably engaged with the inner peripheral wall of the valve casing 97 and the outer wall of the valve block 56. At the longitudinally intermediate portion of the cylindrical guide 110 is formed a radial bore 111 which has a radially outer end communicated with a chamber 112 defined by the cylindrical guide 110 and the valve casing 97 and a radially inner end opened at the inner peripheral wall of the cylindrical guide 110. The inner peripheral wall of the cylindrical guide 110 is formed with a first diameter portion 113a, a second diameter portion 113b having a diameter smaller than that of the first diameter portion 113a, and a third diameter portion 113c having a diameter larger than that of the second diameter portion 113b, which are arranged in this order in a direction away from the equatorial plane 103 of the valve casing 97. A relief valve 114 is slidably engaged with the second diameter portion 113b and has a flange portion 114a which is engageable with an annular ledge formed between the second diameter portion 113b and the third diameter portion 113c. The relief valve 114 has a recess 116 opened at its axially outer end remote from the equatorial plane 103 of the valve casing 97 and an axial bore 117 formed at its axially inner end adjacent to the equatorial plane 103 of the valve casing 97. A compression coil spring 118 is accommodated in the recess 116 to have one end engaged with the axially inner end of the plug 100 and the other end engaged with the bottom of the recess 116 so that the relief valve 114 is urged toward the equatorial plane 103 of the valve casing 97 by the compression coil spring 118 until the flange portion 114a is abutted against the ledge formed between the second diameter portion 113b and the third diameter portion 113c of the inner peripheral wall of the cylindrical guide 110. On the other hand, a cylindrical guide 110' is housed in the valve casing 97 in such a manner that the axially outer end of the cylindrical guide 110' remote from the equatorial plane 103 is threaded to the small diameter portion 100a' of the plug 100' and the axially inner end of the cylindrical guide 110' adjacent to the equatorial plane 103 is slidably engaged with the inner peripheral wall of the valve casing 97 and the outer wall of the valve block 56. At the longitudinally intermediate portion of the cylindrical guide 110' is formed a radial bore 111' which has a radially outer end communicated with a chamber 112' defined by the cylindrical guide 110' and the valve casing 97 and a radially inner end opened at the inner peripheral wall of the cylindrical guide 110'. The inner peripheral wall of the cylindrical guide 110' is formed with a first diameter portion 113a', a second diameter portion 113b' having a diameter smaller than that of the first diameter portion 113a', and a third diameter portion 113c' having a diameter larger than that of the second diameter portion 113b', which are arranged in this order in a direction away from the equatorial plane 103 of the valve casing 97. A relief valve 114' is slidably engaged with the second diameter portion 113b' and has a flange portion 114a' which is engageable with an annular ledge formed between the second diameter portion 113b' and the third diameter portion 113c'. The relief valve 114' has a recess 116' opened at its axially outer end remote from the equatorial plane 103 of the valve casing 97 and axial bore 117' formed at its axially inner end adjacent to the equatorial plane 103 of the valve casing 97. A compression coil spring 118' is accomodated in the recess 116' to have one end engaged with the axially inner end of the plug 100' and the other end engaged with the bottom of the recess 116' so that the relief valve 114' is urged toward the equatorial plane 103 of the valve casing 97 by the compression coil spring 118' until the flange portion 114a' is abutted against the ledge formed between the second diameter portion 113b' and the third diameter portion 113c' of the inner peripheral wall of the cylindrical guide 110'. A cylindrical shuttle valve 119 is slidably received in the first diameter portions 113a and 113a' of the cylindrical guides 110 and 110' to have both axially outer ends engageable with the relief valves 114 and 114'. An annular projection 120 is integrally formed on the longitudinally central portion of the outer peripheral wall of the shuttle valve 119 to permit the shuttle valve 119 to be movable between the opposing faces of the cylindrical guides 110 and 110'. A pair of conduits 121 and 121' are formed in the valve block 56 to have one ends in communication with the chambers 112 and 112', respectively and the other ends in communication with the second annular grooves 88 and 88', respectively.

For the crawler type travelling vehicle of the present invention such as bulldozer, shovel loader and the like, it is required to provide a pair of endless belts and a pair of driving mechanisms for driving the endless belts. In order to make the driving mechanisms exchangeable in this instance, it is most preferable that not only the valve block 56 and the pipes 92, 92' but also drain ports as will be described hereinlater be symmetrically arranged with respect to the central plane equally spaced from the endless belts in the lateral direction of the crawler type travelling vehicle. For this reason, a pair of drain ports 162 and 162' are shown in FIGS. 1, 2 and 5 to be provided on the outer peripheral face 160 of the control block 18 on a drain port line 163 connecting the first and second angular face portions 160a and 160b of the outer peripheral face 160 of the control block 18. The valve spool 59 of the control valve arrangement 53 is substantially parallel with the drain port line 163. The pipes 92 and 92' are positioned above and below an inlet-outlet line 164 substantially perpendicular to the drain port line 163 and the axis of the rotary shaft 13 of the hydraulic motor 11. The lower drain port 162' is always closed by a plug 165 (see FIG. 2). Such arrangement of the drain ports 162 and 162' makes it possible to arrange the valve block 56 and the pipes 92 and 92' in symmetrical relation with respect to the central plane equally spaced from the endless belts, resulting in exchangeability of the driving mechanisms for driving the endless belts in the crawler type travelling vehicle. A pair of conduits 123 and 123' are formed in the control block 18 to have one ends connected with the drain ports 162 and 162', respectively, and the other ends connected with the annular drain chamber 47. A drain pipe 122 is connected to the drain port 162 so that the pressure oil in the annular chamber 47 is discharged through the conduit 123, the drain port 162 and the pipe 122 to a suitable tank not shown in any drawings.

The rotary shaft 13 is generally remained braked by the brake device 34 when the pressure oil source is broken or damaged. In order to release the rotary shaft 13 from being braked, the crawler type travelling vehicle according to the present invention is shown in FIGS. 1 to 3 to further comprise a threaded bore 166 formed in the central portion of the movable member 26 to extend from its axially inner face to its axially outer face in axial alignment with the rotary shaft 13, an operation through bore 167 formed in the central portion of the covering member 27 to be opened at the axially inner face of the control block 18 and at the hydraulic chamber 39 in axial alignment with the threaded bore 166, and a plug 168 threadedly engaged with the operation through bore 167 so as to close the operation through bore 167. When the pressure oil source is broken, the plug 168 is unthreaded from the operation through bore 167 to insert through the operation through bore 167 a suitable device having a foreward end portion to be engageable with the threaded bore 166. The foreward end portion of the device is then caused to be in threaded engagement with the threaded bore 166 to pull the movable member 26 toward the covering member 27 against the compression coil spring 32 so that the annular inner and outer discs 37 and 38 are disengaged from each other to enable the rotary shaft 13 to be freely rotatable.

The operation of the drive controlling mechanism thus constructed and arranged in the above embodiment of the present invention will now be described hereinafter in the drawings.

When the pressure oil is introduced into the second conduit 91 through the pipe 92, the pressure oil is separated through the branched openings 93a and 93b. The pressure oil introduced through the branched opening 93a is passed through the first annular groove 87, the first radial bore 66 and admitted into the axial bore 64 to cause the check valve 68 to be moved away from the equatorial plane 63 of the valve spool 59 against the compression coil spring 72 so that the axial bore 64 is brought into communication with the second radial bore 67, thereby causing the pressure oil to be fed to the cylinder bores 15a of the cylinder block 12 through the second annular groove 88, the first conduit 89 and the arcuate bore 23 of the timing plate 21. On the other hand, the pressure oil through the branched opening 93b is passed through the recess 84, the radial passage 73 and the axial bore 75 to cause the spherical valve 77 to be moved away from the equatorial plane 63 of the valve spool 59 against the conical compression coil spring 78 so that the pressure oil is introduced into the chamber 74 from the axial bore 75 and thereafter admitted into the recess 81 through the axial bore 76. As a result of this, the valve spool 59 is urged toward the dumper valve 80', during which the pressure oil in the recess 81 of the dumper valve 80' is discharged through a gap defined by the dumper valve 80' and the valve spool 59, the recess 84', the second conduit 91' so that the valve spool 59 is moved toward the dumper valve 80' until the axially outer end of the valve spool 59 is engaged with the bottom of the recess 81 of the dumper valve 80'. The movement of the valve spool 59 causes the branched opening 93a of the second conduit 91 to be brought into communication with the central radial bore 90 through the first annular groove 87, while causing the branched opening 94a of the second conduit 91' to be brought into communication with the second annular groove 88' through the first annular groove 87'. The communication between the branched opening 93a of the second conduit 91 and the central radial bore 90 causes the pressure oil in the first annular groove 87 to be introduced into the bore 49a of the bush 49 through the central radial bore 90 so that the shuttle valve 50 is urged toward the rotary shaft 13 against the compression coil spring 51, thereby communicating the bore 49a of the bush 49 with the intermediate diameter portion 48c of the radial bore 48 while closing the small diameter portion 48b of the radial bore 48 by the large diameter stem 50b of the shuttle valve 50. The pressure oil in the bore 49a of the bush 49 is admitted into the chamber 39 through the intermediate diameter portion 48c of the radial bore 48, the conduits 52 and 33 so that the movable member 26 is moved toward the covering member 27 against the compression coil springs 32. The annular inner discs 37 and the annular outer discs 38 come to be disengaged from each other to allow the rotary shaft 13 to be freely rotated. The pressure oil in the cylinder bores 15a causes the pistons 15a causes the pistons 15 to push the inclined plate 14 so that the rotary shaft 13 is driven for rotation, thereby causing the endless belt 1 to be driven through the reduction gear unit 16, the sprocket wheel 5, the pins 4, 4' and legs 3, 3'. The pressure oil which has operated the hydraulic motor 11 is discharged from the cylinder bores 15a into the first conduit 89' through the arcuate bore 23 of the timing plate 21. The communication between the branched opening 94a of the inlet-outlet conduit 91' and the second annular groove 88' allows the pressure coil in the first conduit 89' to be discharged into the pipe 92' through the second annular groove 88', the first annular groove 87', the branched opening 94a, and the second conduit 91'.

When the introduction of the pressure oil into the second conduit 91 through the pipe 92 is stopped, the valve spool 59 is moved toward the dumper valve 80 by the action of the compression coil spring 82' to resume the neutral position as shown in FIG. 5, during which the pressure oil in the recess 81 of the dumper valve 80 is discharged through a gap between the dumper valve 80 and the valve spool 59, the recess 84 and the inlet-outlet conduit 91 to the pipe 92. The movement of the valve spool 59 causes the branched opening 93a of the second conduit 91 not to be brought into communication with the central radial bore 90 through the first annular groove 87, while causing the branched opening 94a of the second conduit 91' not to be brought into communication with the second annular groove 88' through the first annular groove 87'. Under these circumstances, the hydraulic motor 11 continues to be rotated by kinetic energy of a vehicle body which is moving for a short period of time even if no pressure oil is supplied to the hydraulic motor 11, so that the pressure oil is sucked from the first conduit 89 and discharged into the first conduit 89' by the pumping action of the hydraulic motor 11, causing pressure of the pressure oil in the first conduit 89' to be higher than that in the first conduit 89. The pressure oil in first conduit 89' is thus introduced into the chamber 112' through the second annular groove 88' and the conduit 121' to cause the shuttle valve 119 and the relief valve 114 to be moved toward the plug 100 against the compression coil spring 118 until the annular projection 120 of the shuttle valve 119 is brought into engagement with the axially inner end of the cylindrical guide 110. At this time, the chamber 112' comes to be in communication with an inner chamber 119a of the shuttle valve 119 so that the pressure oil in the chamber 112' is introduced into the recess 116 of the relief valve 114 through the inner chamber 119a of the shuttle valve 119 and the axial bore 117, thereby urging the pilot valve 102 toward the adjusting screw 106 against the compression coil spring 104 to open the bore 105 formed in the plug 100. The pressure oil in the recess 116 is therefore admitted into the chamber 112 through the bore 105, the recess 101 and the radial bore 109, whereupon the pressure of the pressure oil in the recess 116 is dropped by the throttling action of the axial bore 117 to move the relief valve 114 toward the plug 100 against the compression coil spring 118. As a result, the inner chamber 119a of the shuttle valve 119 is brought into communication with the chamber 112 through the radial bore 111 so that the pressure oil in the inner chamber 119a of the shuttle valve 119 is admitted into the chamber 112 through the radial bore 111. The pressure oil through the radial bores 109 and 111 is thus merged and then introduced into the first conduit 89 through the conduit 121 and the second annular groove 88. It is to be understood that the pressure oil in the hydraulic motor 11 is circulated through the previously mentioned routes to prevent cavitation of the hydraulic motor 11. On the other hand, the closing of the central radial bore 90 causes the shuttle valve 50 to be urged toward the central radial bore 90 by the action of the compression coil spring 51 until the tapered head 50a of the shuttle valve 50 is brought into engagement with the lower end of the bush 49. At this time, the conduit 52 becomes in communication with the small diameter portion 48b of the radial bore 48 to cause the pressure oil in the chamber 39 to be discharged into the drain pipe 122 through the conduit 33, the conduit 52, the intermediate diameter portion 48c of the radial bore 48, the small diameter portion 48b of the radial bore 48, the grooves 40, 41, the gap 42, the annular groove 43, the axial groove 45, the annular chamber 46, 47 and the conduit 123. The movable member 26 is thus moved toward the rotary shaft 13 by the action of the compression coil springs 32 so that the annular inner discs 37 and the annular outer discs 38 are engaged with each other to brake the rotary shaft 13. If the pressure of the first conduit 89 is abnormally dropped, the check valve 68 is moved away from the equatorial plane 63 of the valve spool 59 against the compression coil spring 72 to cause the pressure oil in the inlet-outlet conduit 91 to be admitted into the first conduit 89, thereby completely preventing the cavitation of the hydraulic motor 11.

Where the hydraulic motor 11 is reversely rotated, the pressure oil may be introduced into the pipe 92' and discharged from the pipe 92.

Although detailed descriptions have been made exclusively on the foregoing embodiment of this invention, it should be understood, as indicated hereinbefore, that the preferred embodiment as described and shown herein does not mean in any way limitations of this invention, but on the contrary, variations and modifications with respect to the construction and operation may further be derived by those skilled in the art to which the present invention pertains, whereby the advantageous characteristics of this invention may be realized without departing from the spirit and scope of the invention as set forth hereunto in the appended claims.

What is claimed is:

1. A crawler type travelling vehicle comprising in combination:
    an endless belt including a number of segments flexibly connected with each other to crawl on the earth;
    a sprocket wheel drivably engageable with said endless belt and having an axial wheel bore extending axially thereof;
    a motor housing inserted in said axial wheel bore to rotatably support said sprocket wheel through two bearings with the mid-circumferential plane of said sprocket wheel positioned between the mid-circumferential planes of said bearings;
    a fixed frame positioned axially inwardly of said sprocket wheel to securely support said motor housing and having an axial frame bore in axial alignment with said axial wheel bore;
    a hydraulic motor accommodated in said motor housing and having a rotary shaft;
    a reduction gear unit positioned axially outwardly of said sprocket wheel and within the width of said endless belt to operably be connected with one end portion of said rotary shaft in driving engagement with said sprocket wheel;
    a control block disposed within the width of said endless belt and securely connected with the axially inner face of said motor housing to rotatably receive the other end portion of said rotary shaft; and
    a pair of inlet-outlet passages in fluid communication with said hydraulic motor to allow fluid under pressure to pass therein for imparting rotation of said hydraulic motor.

2. A crawler type travelling vehicle as defined in claim 1, in which said mid-circumferential plane of said sprocket wheel is equally spaced apart from said mid-circumferential planes of said bearings.

3. A crawler type travelling vehicle as defined in claim 1, which further comprises a parking brake arrangement including a receiving member attached to the axially inner face of said control block to allow the other end portion of said rotary shaft to be projected therein, a covering member attached to the axially inner face of said receiving member to define a hydraulic chamber together with said receiving member and said control block, said hydraulic chamber being in axial alignment with said rotary shaft, a movable member provided in said hydraulic chamber to hydraulically be movable toward and away from the other end portion of said rotary shaft, and brake means provided in said hydraulic chamber to cause the other end portion of said rotary shaft to be engageable with and disengageable from said control block for braking and releasing said rotary shaft.

4. A crawler type travelling vehicle as defined in claim 3, wherein said control block has an axially inner end face and an outer peripheral face with its axially inner end connected to said axially inner end face; and which further comprises a control valve arrangement detachably mounted on the outer peripheral face of said control block to control rotation of said hydraulic motor and actuation of said parking brake arrangement.

5. A crawler type travelling vehicle as defined in claim 4, wherein said outer peripheral face of said control block comprises a first angular face portion corresponding to said endless belt and said sprocket wheel engaged with each other and a second angular face portion corresponding to said endless belt and said sprocket wheel disengaged from each other, said control valve arrangement mounted on said second angular face portion of said outer peripheral face of said control block.

6. A crawler type travelling vehicle as defined in claim 5, wherein said control valve arrangement includes a valve block detachably mounted on the outer peripheral face of said control block, a valve spool accommodated in said control valve arrangement to be movable for controlling rotation of said hydraulic motor and actuation of said parking brake arrangement, said valve spool being located to extend within a plane substantially perpendicular to the axis of said rotary shaft; and wherein each of said inlet-outlet passages includes a first conduit formed in said control block and said valve block to have one end communicated with said hydraulic motor and the other end communicated with said control valve arrangement, a second conduit formed in said valve block to have one end communicated with said control valve arrangement, and a pipe positioned externally of said valve block to have one end connected with the other end of said second conduit to extend in a direction away from said second angular face portion of said outer peripheral face of said control block and within the width of said endless belt.

7. A crawler type travelling vehicle as defined in claim 6, which further comprises a pair of drain ports formed on said outer peripheral face of said control block.

8. A crawler type travelling vehicle as defined in claim 7, wherein said drain ports are provided on a drain port line substantially parallel with the axis of said valve spool of said control valve arrangement.

9. A crawler type travelling vehicle as defined in claim 1, which further comprises a control valve arrangement detachably mounted on said control block to control rotation of said hydraulic motor.

10. A crawler type travelling vehicle as defined in claim 8, wherein said drain ports are disposed on a drain port line connecting said first and second angular face portions of said outer peripheral face of said control block, said valve spool of said control valve arrangement is substantially parallel with said drain port line, said pipes positioned above and below an inlet-outlet line substantially perpendicular to said drain port line and the axis of said rotary shaft of said hydraulic motor.

11. A crawler type travelling vehicle as defined in claim 6, wherein said control valve arrangement further includes a pair of relief valves in parallel with said valve spool so as to control fluid under pressure to be fed to said hydraulic motor in cooperation with said valve spool.

12. A crawler type travelling vehicle as defined in claim 4, which further comprises a control conduit arrangement including a first control conduit having one end in fluid communication with said control valve arrangement and a second control conduit having one end in fluid communication with said hydrualic chamber and the other end opened at the longigudinally intermediate portion of said first control conduit for introducing and discharging fluid under pressure into and from said hydraulic chamber.

13. A crawler type travelling vehicle as defined in claim 12, which further comprises a shuttle valve provided at the longitudinally intermediate portion of said first control conduit where the other end of said second control conduit is opened so as to permit fluid under pressure to be introduced into said hydraulic chamber from said control valve arrangement through said first and second control conduits and to permit fluid under pressure to be discharged from said hydraulic chamber through said first and second control conduits.

14. A crawler type travelling vehicle as defined in claim 13, wherein a drain chamber is formed between said motor housing and said hydraulic motor; and which further comprises a drain passage arrangement having one end in fluid communication with the other end of said first control conduit and the other end in fluid communication with said drain chamber to allow fluid under pressure discharged into said first and second conduits from said hydraulic chamber to be introduced into said drain chamber.

15. A crawler type travelling vehicle as defined in claim 14, wherein said first control conduit of said control conduit arrangement includes a large diameter portion at a position adjacent to said control valve arrangement to fittedly receive a bush, a small diameter portion at a position adjacent to said drain passage arrangement, and an intermediate diameter portion having outer and inner ends respectively connected with said large diameter portion and small diameter portion; and wherein said shuttle valve includes a head disposed in said intermediate diameter portion of said first control conduit to be engageable with said bush, a large diameter stem having one end integrally formed with said head to be disposed in said intermediate diameter portion of said first control conduit, a small diameter stem having one end integrally formed with the other end of said large diameter stem and loosely fitted in said small diameter portion of said first control conduit so as to permit fluid under pressure to be passed through an annular gap formed between said small diameter stem and said small diameter portion, and a compression coil spring accommodated in said intermediate diameter portion to surround said large diameter stem so as to urge said head to be engaged with said bush.

16. A crawler type travelling vehicle as defined in claim 3, which further comprises a threaded bore formed in said movable member, an operation through bore formed in said covering member to be opened at the axially inner face of said control block and at said hydraulic chamber in axial alignment with said threaded bore, and a plug detachably closing said operation through bore.

17. A crawler type travelling vehicle as defined in claim 1, wherein said fixed frame includes a disc portion securely connected to said motor housing and having said axial frame bore in axial alignment with said axial wheel bore of said sprocket wheel, and a covering portion having an inner peripheral face securely connected with the radially outer face of said disc portion and extending axially inwardly of said sprocket wheel to cover said control block.

18. A crawler type travelling vehicle as defined in claim 17, wherein said motor housing includes a flange portion detachably connected with said disc portion of said fixed frame, and a cylindrical portion inserted in said axial wheel bore of said sprocket wheel to be rotatably engaged with said sprocket wheel through two bearings.

19. A crawler type travelling vehicle as defined in claim 18, wherein a circumferential line at the axially inner most end of said axial frame bore of said disc portion is located axially inwardly of a circumferential line at the axially inner most end of said flange portion in contact with said axial frame bore of said disc portion.

20. A crawler type travelling vehicle as defined in claim 1, wherein said motor housing includes a cylindrical portion inserted in said axial wheel bore of said sprocket wheel and having a first peripheral face and a second peripheral face positioned axially inwardly of and connected with said first peripheral face through an annular ledge, said first peripheral face being smaller in diameter than said second peripheral face; and said axial wheel bore has a first peripheral face in opposing relation with said first peripheral face of said cylindrical portion, and a second peripheral face positioned axially inwardly of and connected with said first peripheral face of said axial wheel bore through an annular ledge, said first peripheral face of said axial wheel bore being larger in diameter than said second peripheral face of said axial wheel bore, said bearings being disposed between said first peripheral face of said motor housing and said first peripheral face of said axial wheel bore; and which further comprises an oil seal means disposed between said second peripheral face of said motor housing and said second peripheral face of said axial wheel bore.

* * * * *